Aug. 9, 1966   C. WALLACE   3,264,807
MOWER
Filed Aug. 24, 1964

INVENTOR.
CLARENCE WALLACE
BY Charles L. Lovercheck
attorney

United States Patent Office 3,264,807
Patented August 9, 1966

3,264,807
MOWER
Clarence Wallace, 101 1st Ave., Corry, Pa.
Filed Aug. 24, 1964, Ser. No. 391,662
2 Claims. (Cl. 56—25.4)

This invention relates to mowers and, more particularly, to mowers for mowing airports, golf courses, and other large areas.

Mowers of the general type disclosed herein made according to previous designs were usually driven by belts from the towing vehicle or from hydraulic motors actuated from a pump driven by the towing vehicle.

These previous machines required hoses and other connections passing from the towing vehicle to the mower which were cumbersome, inconvenient, and required high maintenance.

The mower according to the present invention has individual gasoline actuated engines driving each individual blade. Thes engines are self-contained and require no electrical or hose connections and, therefore, provide a simple, efficient, and economical driving mechanism for the mower.

It is, accordingly, an object of the present invention to provide an improved mower.

Another object of the invention is to provide a mower which is simple in construction, economical to manufacture, and simple and efficient to use.

Still another object of the invention is to provide a mower having individual, self-contained actuating units for each of its plurality of blades.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
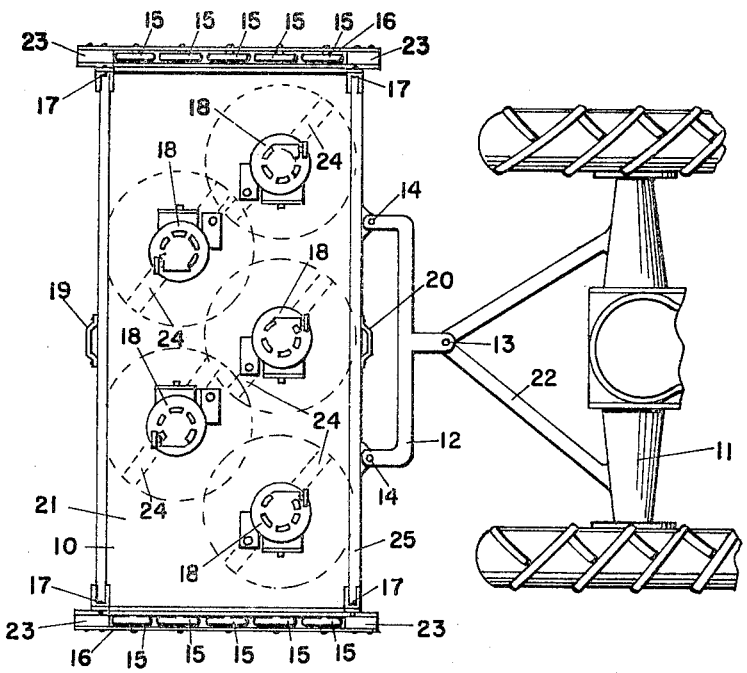
FIG. 1 is a top view of a mowing machine according to the invention.
Figure 2:
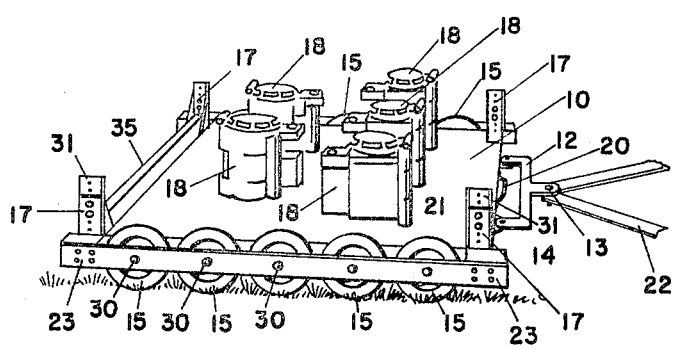
FIG. 2 is an isometric view of the machine shown in FIG. 1.
Figure 3:
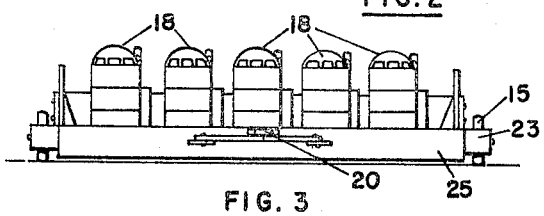
FIG. 3 is a front view of the mower.
Figure 4:
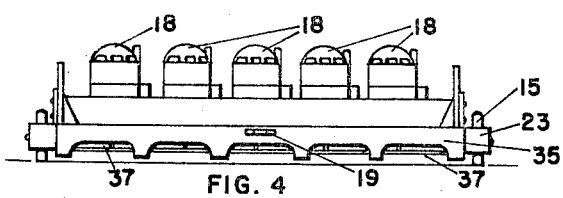
FIG. 4 is a rear view of the mower.

Now with more particular reference to the drawings, the mowing machine indicated generally at 10 is attached to the towing vehicle or tractor 11 by means of the draw bar 22 of a conventional type which is connected by means of hitch pin 13 to the hitch 12 which is swingably attached to the front of the mower by pivot pins 14.

The mower has a platform 21 which may be considered to be a frame which may be made, for example, of heavy plywood and the plywood platform 21 has a heavy transverse member 25 which may be, for example, a two inch thick member which extends down flush with the lower surface of the side frames or wheel support channel extensions 23. The side wheels 15 are supported on axles 30 on the wheel channels 16 and may be supported between the side members of the channels. As shown in the drawings, the wheels 15 may be approximately five in number and are spaced adjacent each other so that the mower will be supported a uniform spacing above the ground. A transverse member 25 is attached to the front of said platform and it extends down to a position generally flush with the lower edge of said wheel channels and it bends the grass over as the machine moves forward. The rear bar 35 is attached to the rear of the platform and it has spaced relieved portions 37 that allow grass and weeds to escape after they are cut.

The adjusting brackets 17 are fixed to the wheel channels and have holes therein which are coextensive with similar holes in brackets 31 so that the wheels may be adjusted up or down to adjust the length of cut of the grass.

The rear lifting handles 19 are fastened on the rear end of the mower so that the mower may be lifted from the ground. A similar handle 20 is attached to the front of the mower.

The rotary mowers 18 are of a conventional type familiar to those skilled in the art which have a blade 24 supported on the drive shaft of engines 18. These individual engines have downwardly extending shafts which extend through the platform 21 and have the mower blade 24 on the lower end. The mower blades 24 may be, for example, twenty-one inches long and the paths through which their ends move slightly overlap each other. The blades may be bent in the form of propellers so that they provide a vacuum which lifts the grass and weeds that were bent over by the member 25 as it cuts them. As shown in the drawing, the individual mowers may be five in number; for example, spaced in two rows staggered from each other. Thus, the support wheels will carry the mower over slightly uneven areas of ground. The individual motors need no connection to any common source of fuel or power. The adjustable sides make provision for adjusting the height of cut of grass and the mower may be moved forward, backward, or sideways without interrupting the effect of its cut.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A mower for cutting grass and the like comprising
   a rigid support platform disposed generally in a horizontal plane,
   a plurality of internal combustion engines supported on said platform,
   each said engine having a depending drive shaft extending through said platform,
   a plurality of blades,
   one of said blades being attached to a depending end of each of said drive shafts and adapted to be rotated thereby in a generally horizontal plane,
   said blades defining circular paths which overlap in the intended direction of movement of said mower,
   means to attach said platform to a towing vehicle,
   an elongated wheel channel member at each end of said platform,
   at least three ground engaging wheels in each said channel member,
   and axle means attaching each said wheel to a said wheel channel member,
   and means adjustably attaching said wheel channel members to each end of said platform whereby said adjusting means adjustably supports said channel members and said wheels on said platform.

2. The mower recited in claim 1 wherein
   an elongated front bar is attached to the front edge of said platform and extends downwardly therefrom substantially from one end of said platform to the other, and an elongated rear bar is attached to the rear edge of said platform and extends downwardly therefrom, said rear bar having a relieved portion formed in the lower side thereof for allowing grass and weeds to flow therethrough.

References Cited by the Examiner

UNITED STATES PATENTS

| | | | |
|---|---|---|---|
| 2,806,339 | 9/1957 | Whitney | 56—25.4 |
| 2,818,269 | 12/1957 | Northcote et al. | 56—25.4 X |
| 2,891,369 | 6/1959 | Rietz | 56—25.4 |
| 2,920,434 | 1/1960 | Ingram | 56—6 X |
| 3,116,583 | 1/1964 | Mason | 56—6 |
| 3,157,014 | 11/1964 | Bottenberg | 56—6 |

FOREIGN PATENTS 1,250,261  11/1960  France.

ABRAHAM G. STONE, *Primary Examiner.*

RUSSELL R. KINSEY, *Examiner.*

M. C. PAYDEN, *Assistant Examiner.*